US012625108B2

(12) United States Patent
Seo

(10) Patent No.: US 12,625,108 B2
(45) Date of Patent: May 12, 2026

(54) SENSOR ELEMENT FOR GAS SENSOR HAVING NANOROD STRUCTURE AND MANUFACTURING METHOD THEREOF, AND GAS SENSOR

(71) Applicant: Hongik University Industry-Academia Cooperation Foundation, Seoul (KR)

(72) Inventor: Jung Hwan Seo, Seoul (KR)

(73) Assignee: Hongik University Industry-Academia Cooperation Foundation, Seoul (KR)

(*) Notice: Subject to any disclaimer, the term of this patent is extended or adjusted under 35 U.S.C. 154(b) by 163 days.

(21) Appl. No.: 18/435,529

(22) Filed: Feb. 7, 2024

(65) Prior Publication Data

US 2024/0264117 A1 Aug. 8, 2024

(30) Foreign Application Priority Data

Feb. 8, 2023 (KR) ........................ 10-2023-0016961

(51) Int. Cl.
*G01N 27/66* (2006.01)

(52) U.S. Cl.
CPC .................................... *G01N 27/66* (2013.01)

(58) Field of Classification Search
CPC .... G01N 27/66; G01N 27/127; G01N 27/123; G01N 27/128; B82Y 15/00; B82Y 40/00
USPC ....................................................... 324/464
See application file for complete search history.

(56) References Cited

U.S. PATENT DOCUMENTS

| | | | | |
|---|---|---|---|---|
| 2002/0017126 A1* | 2/2002 | DiMeo, Jr. | ........... | G01N 21/783 |
| | | | | 73/31.05 |
| 2003/0139003 A1* | 7/2003 | Gole | .................... | G01N 27/128 |
| | | | | 438/200 |
| 2008/0101994 A1* | 5/2008 | Virji | ...................... | B82Y 15/00 |
| | | | | 422/94 |
| 2013/0311108 A1* | 11/2013 | Stetter | .................. | G01N 27/128 |
| | | | | 702/22 |
| 2018/0372662 A1* | 12/2018 | Boudaden | ............ | G01N 27/127 |

FOREIGN PATENT DOCUMENTS

| | | |
|---|---|---|
| JP | 7114161 B2 | 8/2022 |
| KR | 10-2009-0084318 A | 8/2009 |
| KR | 10-2011-0040012 A | 4/2011 |
| KR | 101699454 | 1/2017 |
| KR | 10-2017-0040689 A | 4/2017 |

OTHER PUBLICATIONS

Translation of KR 20170040689 (Year: 2017).*
Luo, Chaoyun, et al. "Review of recent advances in inorganic photoresists." RSC advances 10.14 (2020): 8385-8395. (Year: 2020).*
Office Action in Korean Appln. No. 10-2023-0016961, mailed on Sep. 26, 2024, 13 pages (with English translation).

* cited by examiner

*Primary Examiner* — Christopher P Mcandrew
(74) *Attorney, Agent, or Firm* — Fish & Richardson P.C.

(57) ABSTRACT

A sensor element for a gas sensor has a substrate, and a channel formed in the substrate and configured to allow gases to flow therein, wherein the channel has nanoscale nanorods inside, the nanorods interfering with a flow of gaseous phase materials in the gases flowing in the channel, and the gas sensor has the sensor element for the gas sensor, and a detection sensor to detect the gaseous phase materials exiting the sensor element for the gas sensor.

18 Claims, 11 Drawing Sheets

SENSOR ELEMENT FOR GAS SENSOR HAVING NANOROD STRUCTURE AND MANUFACTURING METHOD THEREOF, AND GAS SENSOR

DESCRIPTION OF GOVERNMENT-FUNDED RESEARCH AND DEVELOPMENT

This research is conducted by Hongik University, and funded by Convergence Research Group project of National Research Foundation of Korea, Ministry of Science and ICT, Republic of Korea (Development of micro-GC sensor system for detecting mixed gas in air pollution, No. 1711141350).

CROSS-REFERENCE TO RELATED APPLICATION

This application claims priority to Korean Patent Application No. 10-2023-0016961, filed on Feb. 8, 2023, and all the benefits accruing therefrom under 35 U.S.C. § 119, the contents of which in its entirety are herein incorporated by reference.

BACKGROUND

1. Field

The present disclosure relates to a sensor element for a gas sensor and a manufacturing method thereof, and a gas sensor, and more particularly, to a sensor element for an ultra-small gas sensor with improved separation performance of gaseous phase materials in a gas mixture using a nanorod structure and a manufacturing method thereof, and a gas sensor.

2. Description of the Related Art

Studies have been made on gas sensors to quickly and accurately detect gaseous phase materials that may cause damage such as hazards or contamination in industrial environments.

FIG. 1 is a schematic diagram of a conventional gas sensor.

According to the conventional art, the gas sensor includes a concentration chamber 1 to filter hazardous materials in air to produce concentrates and store the concentrates, a separation path 2 into which the hazardous material concentrates in the concentration chamber 1 are injected, and a detection sensor 3 to detect the concentration of each of the types of the hazardous materials leaving the separation path 2. The concentration chamber 1, the separation path 2 and the detection sensor 3 are in fluid communication with each other by a channel 4.

More specifically, gases including gaseous phase materials (hereinafter, in some cases, referred to as "gas mixture" or simply "gases" in the present disclosure) are fed into the concentration chamber 1. The gaseous phase materials included in the gases are adsorbed onto an adsorbent packed in the concentration chamber 1.

When heat is applied for a predetermined time after preconcentration of the gaseous phase materials, the gaseous phase material concentrates stored in the concentration chamber 1 are separated from the adsorbent by thermal energy, and carrier gas 30 flowing across the concentration chamber 1 carries the concentrates out of the chamber 1. The carrier gas 30 carrying the gaseous phase materials flows to the separation path 2.

FIG. 2 shows schematically the inner part of the separation path 2 of the conventional gas sensor.

As shown in FIG. 2, a porous material 20 is coated on the inner surface of the separation path 2 where the gaseous phase materials 11, 12 may be attached.

The gaseous phase materials 11, 12, most of which are organic compounds are attached to the porous polymer by van der Waals forces. In this instance, when the carrier gas 30 flows in the separation path 2, the gaseous phase materials 11, 12 attached to the porous material 20 are separated from the porous material 20 by the force of the carrier gas 30, move a predetermined distance and attach to the porous material 20 again as they lose mobility, and this process repeats.

Since the gaseous phase materials 11, 12 differ in mass and van der Waals forces interacting with the porous material 20 depending on components, as shown in FIG. 2, the gaseous phase materials 11, 12 of different types differ in frequency and distance to which the gaseous phase materials 11, 12 attach the porous material 20 and then separate and move. That is, the gaseous phase materials 11, 12 move in the separation path 2 at different movement speeds depending on components. For example, among a first material 11 indicated in triangle and a second material 22 indicated in circle, the second material 22 moves faster. The gaseous phase materials 11, 12 leaving the exit of the separation path 2 in a sequential order are detected by the detection sensor 3.

According to the conventional art, to ensure separation accuracy of the gaseous phase materials, the separation path 2 having a very narrow gap and thereby a very small cross sectional area extends, for example, over about 3 m. To this end, the separation path 2 extends in a serpentine pattern in a column shape.

The conventional art achieved the gas sensor with accuracy and small size through this configuration.

However, there is still a demand for sensors with smaller size and improved sensing capability in the gas sensor field.

SUMMARY

The present disclosure discloses a gas sensor having a smaller size while maintaining sensing accuracy and/or for significantly improving sensing accuracy at the same size and a sensor element for a gas sensor.

According to an aspect of the present disclosure, there is provided a sensor element for a gas sensor including a substrate, and a channel formed in the substrate and configured to allow gases to flow therein, wherein the channel has nanoscale nanorods inside, the nanorods interfering with a flow of gaseous phase materials in the gases flowing in the channel.

According to an embodiment, the channel is formed by a groove formed in the substrate by etching, and the nanorods are formed by an unetched portion of the substrate other than the groove.

According to an embodiment, a porous material capable of adsorbing the gaseous phase materials is coated on the inside of the channel, and the channel is a separation path to separate the gaseous phase materials in the gases flowing in the channel into types during movement by repeated adsorption and desorption to/from a structure in the channel.

According to an embodiment, the channel is filled with an adsorbent material capable of capturing the gaseous phase materials, and the channel is a concentration chamber for capturing the gaseous phase materials in the gases flowing in the channel inside the channel.

According to an embodiment, a porous material capable of adsorbing the gaseous phase materials is coated on an inside of a portion of the channel formed in the substrate, and an adsorbent material capable of capturing the gaseous phase materials is filled in other portion of the channel formed in the substrate.

According to another aspect of the present disclosure, there is provided a method for manufacturing a sensor element for a gas sensor including preparing a substrate, forming a masking layer on the substrate, removing the masking layer corresponding to an area in which a channel will be formed, and etching a groove in the substrate to form the channel, wherein the masking layer is etched together during the etching and a material of the masking layer breaks down into nanoparticles, and the nanoparticles accumulate within the groove and act as a micro-mask, and wherein a portion of the substrate that is not etched by the micro-mask forms nanorods in the channel.

According to an embodiment, the forming of the masking layer comprises: forming a hard masking layer on the substrate, and applying a photosensitizer onto the hard masking layer, and the removing of the masking layer comprises: removing the photosensitizer corresponding to an area in which the channel will be formed, and removing the hard masking layer exposed by removing the photosensitizer.

According to an embodiment, a distance between two adjacent channel walls that form the channel is set such that all the nanoparticles do not outgas during the etching and some of the nanoparticles remain in the groove.

According to an embodiment, a thickness of the channel walls that form the channel is set to a thickness such that the channel walls do not collapse during the etching.

According to an embodiment, the method for manufacturing the sensor element for the gas sensor further comprises: coating a porous material capable of adsorbing the gaseous phase materials on an inside of the channel.

According to an embodiment, an auxiliary wall is formed between the channel walls that form the channel, and the removing of the masking layer comprises not removing the masking layer corresponding to an area in which the auxiliary wall will be formed within the area in which the channel will be formed.

According to an embodiment, a distance between the channel wall and the auxiliary wall and between adjacent auxiliary walls is set such that all the nanoparticles do not outgas during the etching and some of the nanoparticles remain in the groove.

According to an embodiment, a thickness of the auxiliary wall is set to a thickness such that the auxiliary wall collapses during the etching.

According to an embodiment, the method for manufacturing the sensor element for the gas sensor further comprises: coating an adsorbent material capable of capturing the gaseous phase materials on an inside of the channel.

According to still another aspect of the present disclosure, there is provided a gas sensor including the sensor element for the gas sensor, and a detection sensor to detect the gaseous phase materials exiting the sensor element for the gas sensor.

According to an embodiment, a porous material capable of adsorbing the gaseous phase materials is coated on the inside of the channel, and the channel is a separation path along which the gaseous phase materials in the gases move at different speeds depending on components, and the detection sensor detects the gaseous phase materials leaving the separation path at a time interval.

According to an embodiment, an adsorbent material capable of capturing the gaseous phase materials is coated on the inside of the channel, and the channel is a concentration chamber capable of capturing the gaseous phase materials in the gases, and the gas sensor further comprises a heating device to selectively heat the concentration chamber.

According to an embodiment, a porous material capable of adsorbing the gaseous phase materials is coated on an inside of other portion of the channel than the channel acting as the concentration chamber, and is a separation path along which the gaseous phase materials in the gases move at different speeds depending on components, and the gaseous phase materials exiting the concentration chamber enter the separation path and are separated into types when heated by the heating device, and the detection sensor detects the gaseous phase materials leaving the separation path at a time interval.

DETAILED DESCRIPTION

Hereinafter, exemplary embodiments of the present disclosure will be described with reference to the accompanying drawings. Although the present disclosure is described with reference to the embodiments shown in the accompanying drawings, this is provided by way of illustration, and the technical spirit of the present disclosure and the essential components and their operation are not limited thereto.

Figure 1:
FIG. 1 shows schematically a conventional gas sensor.
Figure 1:
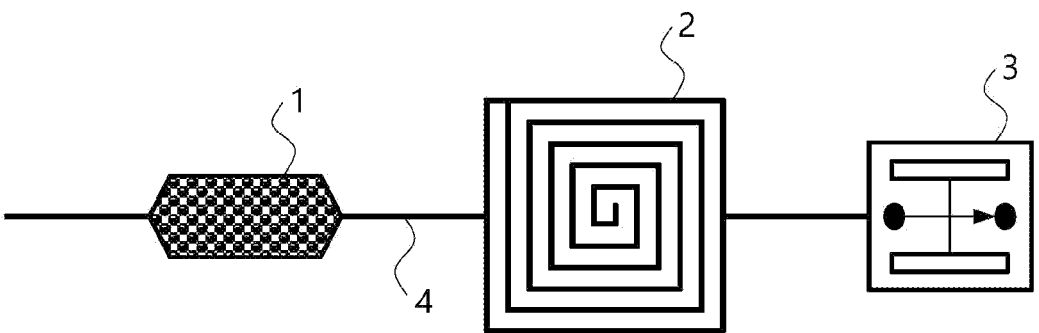
Figure 2:
FIG. 2 shows schematically the inner part of a separation path of a conventional gas sensor.
Figure 2:
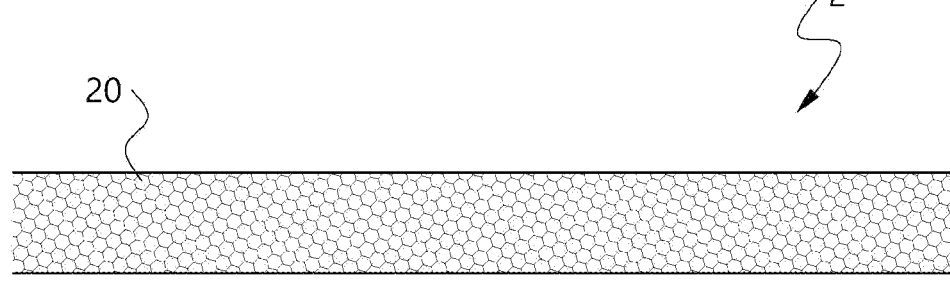
Figure 2:
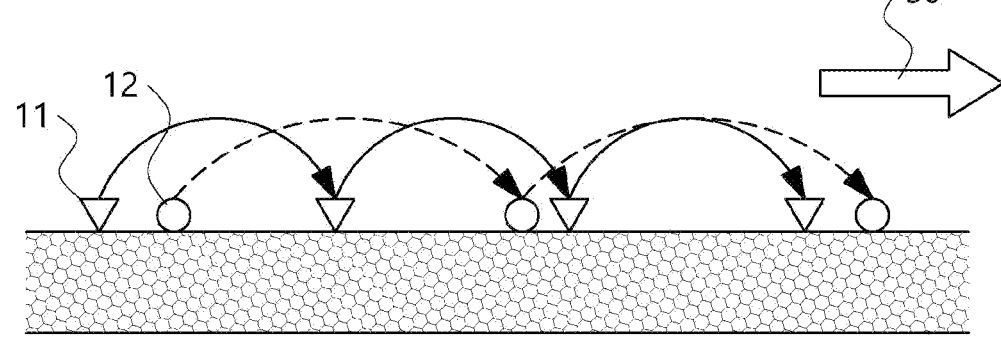
Figure 3:
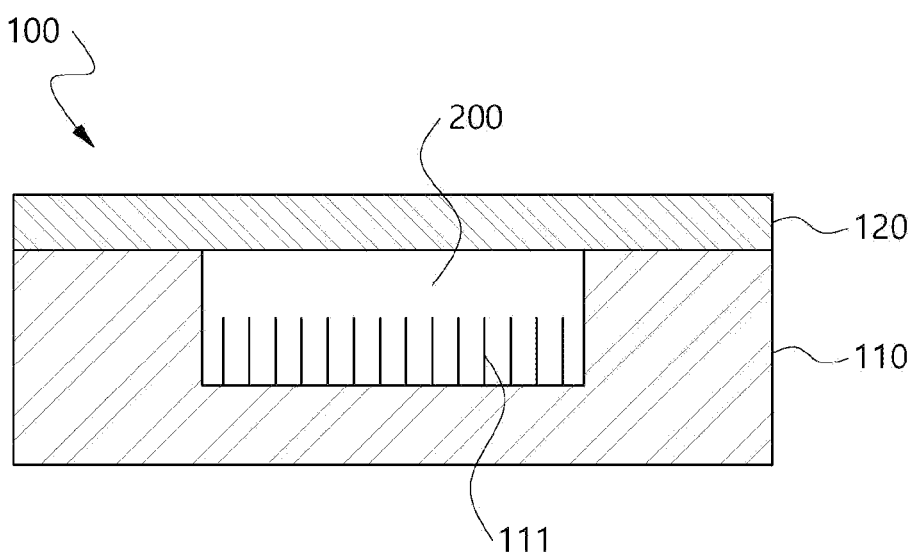
FIG. 3 is a schematic diagram of a sensor element for a gas sensor according to an embodiment of the present disclosure.

FIG. 3 is a schematic diagram of an element for a gas sensor 100 (hereinafter, simply referred to as the "sensor element") according to an embodiment. The sensor element 100 according to this embodiment is configured to provide a flow of gases in the gas sensor (sensor system) that detects/analyzes gaseous phase materials. The "sensor element" may refer to both a module that is separately formed and physically separable from the gas sensor (sensor system), and a module that is directly or integrally formed in a base of the gas sensor (sensor system) and functionally separable from the gas sensor.

As shown in FIG. 3, the sensor element 100 includes a substrate 110 formed using a silicon wafer, and a channel 200 formed in the substrate 110. A cover 120 covering the groove-shaped channel 200 is attached to the top of the substrate 110.

The channel 200 is a space defined by two walls (channel walls) facing each other and a bottom, and becomes a passage in which gases flow therein.

The channel 200 has nanoscale nanorods 111 that interfere with a flow of gaseous phase materials in the gases flowing along the channel 200.

First, a method for manufacturing the sensor element 100 (hereinafter, referred to as the "manufacturing method") will be described with reference to FIG. 4. FIG. 4A to FIG. 4G are conceptual diagrams illustrating each step of the method for manufacturing the sensor element 100 according to an embodiment.

Figure 4A:
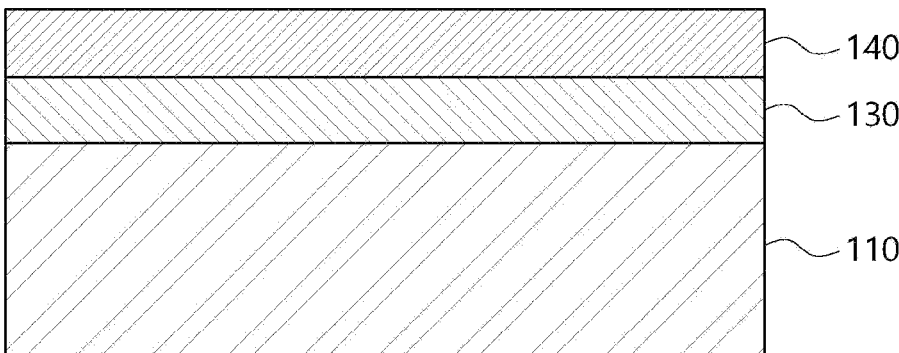
FIGS. 4A to 4G are conceptual diagrams illustrating each step of a method for manufacturing the sensor element shown in FIG. 3.

According to an embodiment, as shown in FIG. 4A, the manufacturing method includes preparing the substrate 110, i.e., the silicon wafer, and forming masking layers 130, 140 on the substrate 110.

According to this embodiment, the step of forming the masking layers includes forming the hard masking layer 130 on the substrate 110, and applying a photosensitizer (PR) onto the hard masking layer 130 to form the photosensitive layer 140.

In this embodiment, the hard masking layer 130 is formed by depositing aluminum on the substrate 110.

The photosensitizer used to form the photosensitive layer 140 may include any photosensitizer commonly used in the conventional semiconductor process. In this embodiment, positive PR is used. When exposed to light through an exposure process, the exposed portion becomes soluble in a developer solution.

Figure 4B:
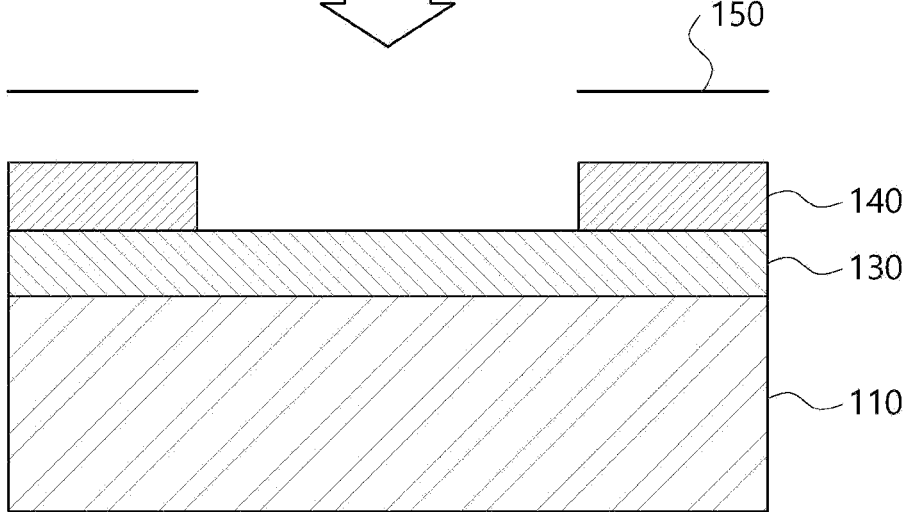
Figure 4C:
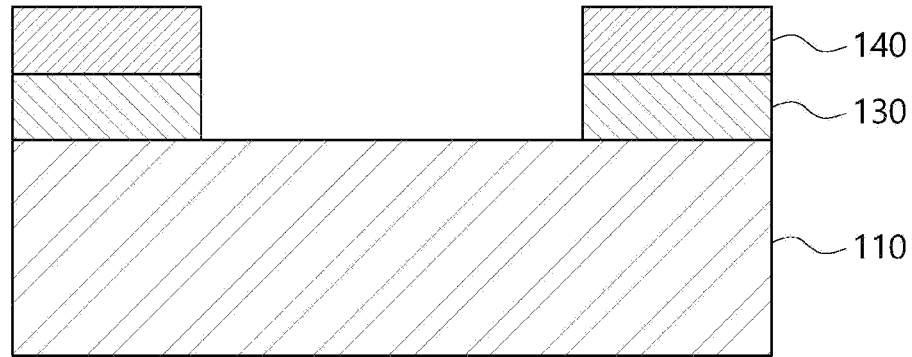

Subsequently, as shown in FIGS. 4B and 4C, the step of removing the masking layers 130, 140 corresponding to an area in which the channel 200 will be formed on the substrate 110 is performed.

First, as shown in FIG. 4B, a patterned mask 150 is disposed at a location corresponding to the location of the sidewall 112 of the channel 200, and the exposure process is performed to transfer the pattern. Subsequently, a photoresist exposed to light is dissolved and removed using the developer solution. Accordingly, the hard masking layer 130 corresponding to the area in which the channel 200 will be formed is exposed.

Subsequently, as shown in FIG. 4C, the hard masking layer 130 exposed by removing the photosensitizer is removed. In this embodiment, the hard masking layer 130 made of aluminum is removed using an aluminum etchant. A portion of the hard masking layer 130 covered by the photosensitive layer 140 remains, and the exposed portion of the hard masking layer 130 where the channel 200 will be formed, is removed.

The process described in FIGS. 4A to 4C is already known in the semiconductor process, and a detailed description of additional processes necessary for pre- and post-treatment of each step is omitted.

Figure 4D:
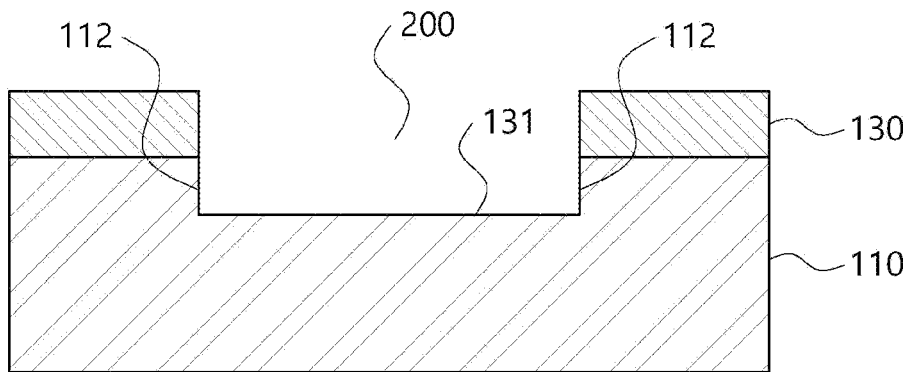
Figure 4E:
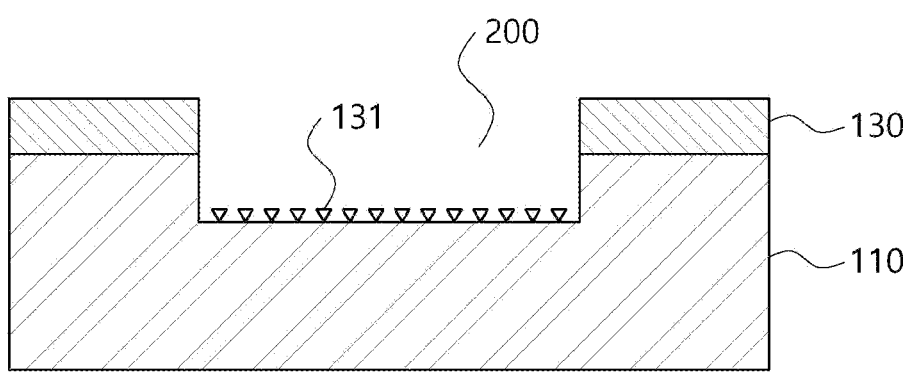
Figure 4F:
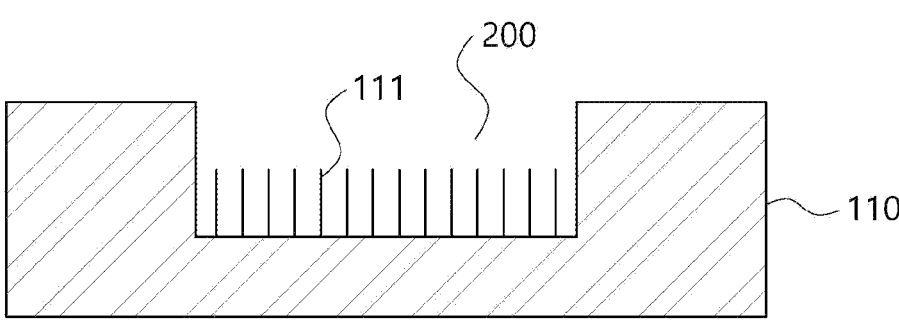
Figure 4G:
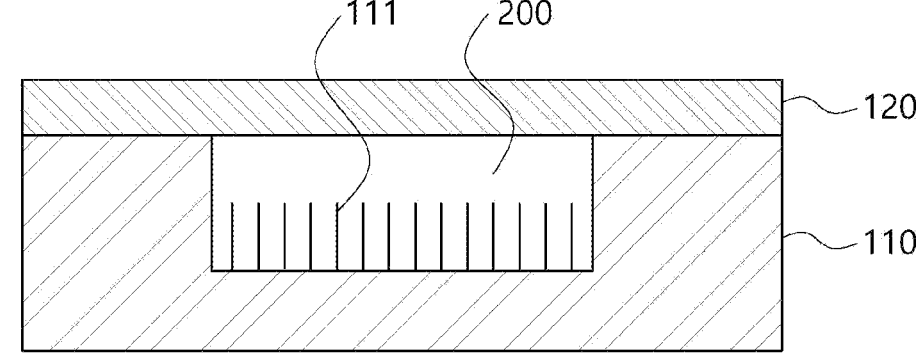

Subsequently, as shown in FIG. 4D to 4F, the step of forming the channel 200 by etching a groove in the substrate 110 is performed.

According to this embodiment, the etching is performed using a deep reactive ion etching (DRIE) process (hereinafter, simply referred to as the "etching process").

As shown in FIG. 4D, when the etching process is performed, as the groove is formed in the exposed upper surface of the substrate 110, the channel 200 starts to form. Hereinafter, a surrounding area around the area in which the nanorods 111 will be formed in the channel 200 are defined as the sidewall 112 and the bottom 113. The embodiment of FIG. 4 shows that the sidewall 112 remains after the etching process and becomes the channel wall of the channel 200.

In a predetermined time after the channel 200 starts to form, the photosensitive layer 140 is removed by the etching process and only the hard masking layer 130 remains on the substrate 110.

As shown in FIG. 4E, when the etching process is continuously performed, the groove of the substrate 110 is etched deeper than FIG. 4D. In this instance, the hard masking layer 130 is also etched away by the etching process.

In the etching process, the masking layer is also etched and its material breaks down into nanoparticles, and the nanoparticles 131 float and accumulate on the bottom 113 of the groove that forms the channel 200.

In this embodiment, in the same way as the conventional semiconductor process, outgassing is performed to remove impurities. However, as described below, since the channel 200 according to this embodiment has a very small width, as opposed to the conventional semiconductor process, it is understood that the nanoparticles 131 accumulate within the channel 200 due to inadequate outgassing in the channel 200.

The nanoparticles 131 accumulating within the groove of the channel 200 act as a micro-mask in the etching process.

Accordingly, as shown in FIG. 4F, an area in which the nanoparticles 131 build up is not etched, and an area in which the nanoparticles 131 do not build up is etched at the intended speed. In other words, there is a change in the extent of etching in the channel 200, and as a result, as shown in FIG. 4F, a portion of the substrate 110 remains in the channel 200 (due to inadequate etching) to form a very large number of nanorods 111 protruding from the bottom.

Finally, when the cover 120 of a size corresponding to the substrate 110 is joined to the substrate 110, the step of forming the channel 200 in the substrate 110 is completed. In this embodiment, the cover 120 is a glass plate, and is joined to the top of the substrate 110 by anodic bonding.

Figure 5:
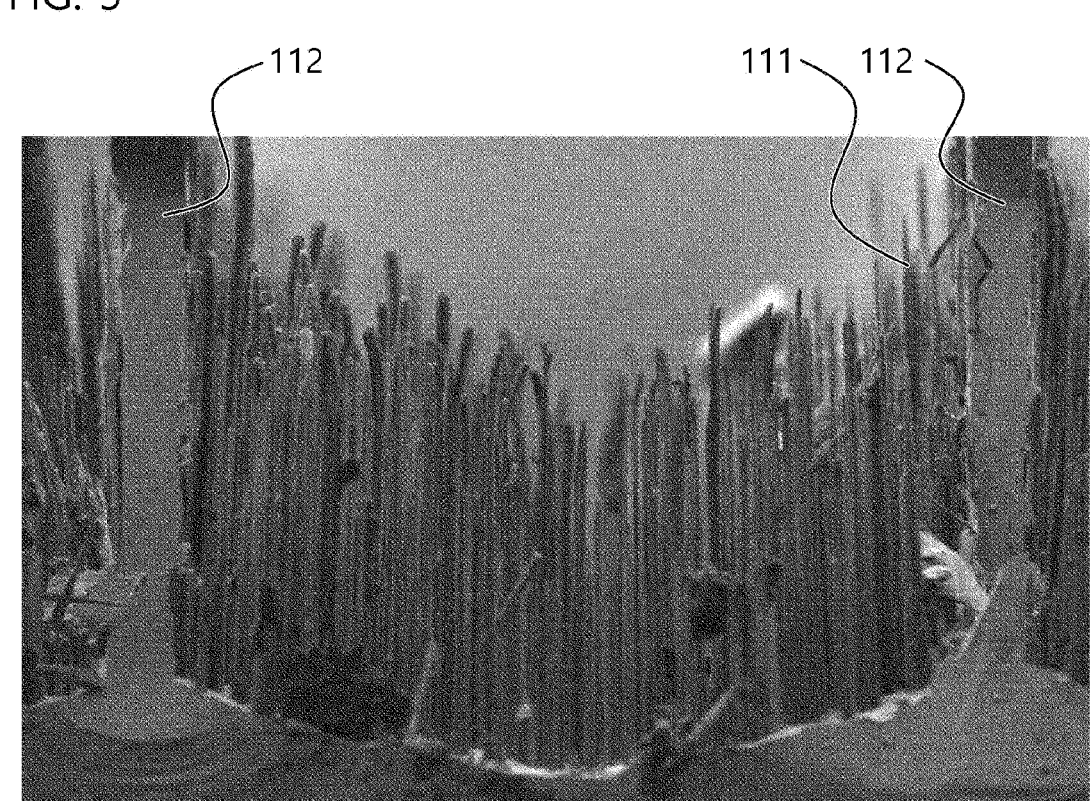
FIG. 5 is an enlarged scanning electron microscopy (SEM) image of a channel on a sensor element for a gas sensor according to an embodiment.

FIG. 5 is an enlarged scanning electron microscopy (SEM) image of the channel 200 on the sensor element 100 according to an embodiment.

As shown in FIG. 5, a large number of nanorods 111 are formed between the adjacent sidewalls 112 of the channel 200.

Since the nanorods 111 are formed by the action of the micro-mask of the nanoparticles 131 that build up on the channel 200 in the etching process, it is confirmed that the length of the nanorods 111 is not completely uniform and the nanorods 111 protrude irregularly.

Additionally, since the groove of the channel 200 is etched to a predetermined depth before the hard masking layer 130 is etched (see FIG. 4E), the length of the nanorods 111 is shorter than the sidewall 112. In other words, when the etch timing is adjusted by adjusting the thickness of the hard masking layer 130 and the photosensitive layer 140, the length of all the nanorods 111 may be adjusted.

Furthermore, when the width of the channel 200 is reduced to regulate the outgassing of the nanoparticles 131, the length of the nanorods 111 may be increased, and the number of nanorods 111 may be adjusted.

On the other hand, the inventors found that when the width (i.e., the distance between the sidewalls 112) of the channel 200 is too large, the nanorods 111 may not be formed. It is thought that when the width of the channel 200 is large, the micro-mask action by the nanoparticles 131 does not take place due to adequate outgassing.

According to this embodiment, the distance between the two sidewalls 112 of the channel 200 is set to a height such that all the nanoparticles 131 do not outgass and at least some of them fall down and remain in the groove, to make sure that the nanorods 111 are formed with a predetermined height or more. In an example, the distance between the two sidewalls 112 of the channel 200 is 200 μm or less.

Additionally, due to the characteristics of the DRIE process, as the depth is deeper, etching acts on the side more greatly, so it is confirmed that the lower portion of the sidewall 112 is much more etched than the upper portion and the thickness becomes smaller. In other words, when the thickness of the sidewall 112 is too small, it means that the lower portion of the sidewall 112 may break and the sidewall 112 may collapse during the etching process.

Accordingly, in this embodiment, in the channel 200 in which the sidewall 112 should be retained, the thickness of the sidewall 112 of the channel 200 is set to a dimension such that the sidewall 112 of the channel 200 does not collapse and is retained in the etching process. In an example, the thickness of the sidewall 112 of the channel 200 is 15 μm or more.

The inventors found that when the channel 200 having many nanorods 111 inside is used as a flow channel of gases within the sensor element 100 for the gas sensor, it may be possible to maximize the area that interferes with the flow of the gaseous phase materials in the gases within the channel 200.

Figure 6:
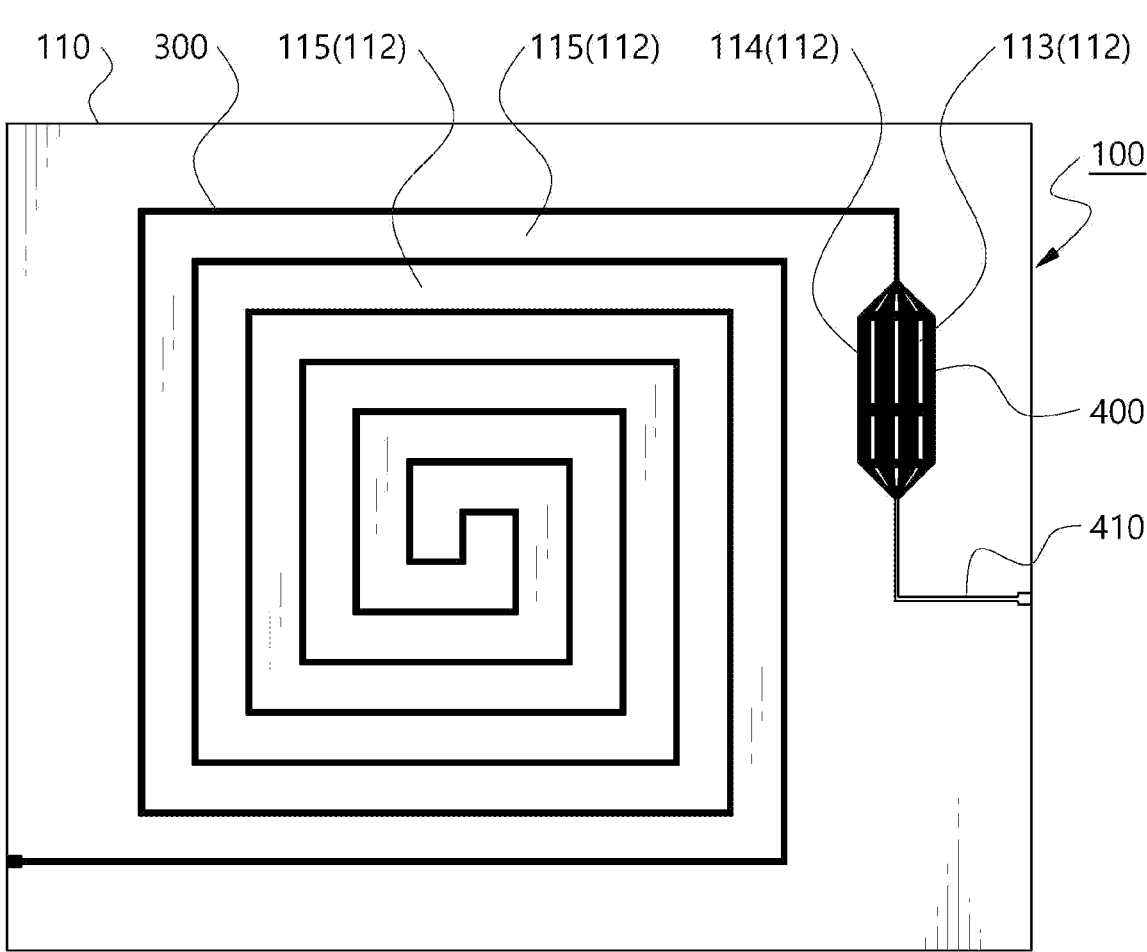
FIG. 6 is a schematic diagram of a sensor element for a gas sensor according to an embodiment when viewed from top.

FIG. 6 is a schematic diagram of the sensor element 100 according to an embodiment of the present disclosure when viewed from top.

According to this embodiment, first, the channel 200 is used as a separation path 300 to separate the gaseous phase materials into types during movement by repeated adsorption and desorption of the gaseous phase materials to/from the structure (the nanorods 111 and the inner surface) within the channel 200.

For the separation path 300 to have the channel 200 of a sufficient length to separate the gaseous phase materials, the separation path 300 is disposed to form a single layer of column bent in a maze shape within a preset square or rectangular space.

As shown in FIG. 6, the separation path 300 bends and extends from an entrance 301 of the separation path 300 to the center of the square or rectangular space in a sort of coil shape, and extends from the center back to an exit 302 of the separation path 300 in the coil shape. That is, the path extending in a serpentine pattern toward the center in the column shape and the channel 200 extending back away from the center are arranged in an alternate manner adjacent to each other, thereby maximizing the path length of the separation path 300 within the small space. Although FIG. 6 shows the adjacent channels 200 spaced a sufficient distance apart from each other for convenience of illustration, the distance between the adjacent channels 200 is very small.

Figure 7:
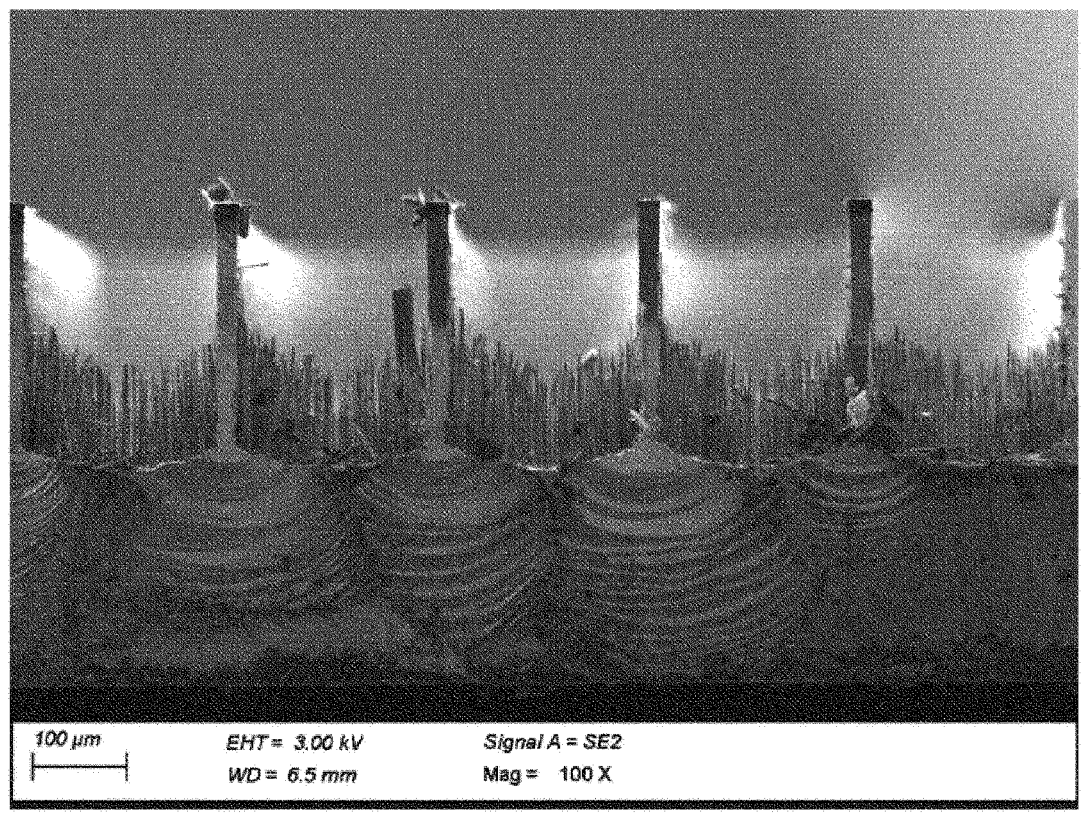
FIG. 7 is an enlarged SEM image of a portion of a separation path on a sensor element for a gas sensor according to an embodiment.

FIG. 7 is an enlarged SEM image of a portion of the separation path 300 on the sensor element 100 according to an embodiment. FIG. 7 is a cross-sectional image, for example, showing five lines of the channel 200 extending along the horizontal direction in FIG. 6 when viewed from the right side in FIG. 6.

Six thick and high walls in FIG. 7 are the channel wall 115 of the channel 200 of the separation path 300 and the sidewall 112 described in the process of FIG. 4. That is, the gray shaded area in the separation path 300 in FIG. 6 is an area in which the groove is formed by removing the masking layer.

As shown in FIG. 7, a space between the channel walls 115 is the channel 200. A large number of nanorods are formed in the channel 200 between the channel walls 115.

In FIG. 6, the width of the channel 200 is small while the thickness of the channel wall 115 is much larger for convenience of illustration. The real scale of the channel wall 115 and the channel 200 is as shown in FIG. 7.

In an example, to form the nanorods 111 in the channel 200 and increase separation efficiency of the gaseous phase materials, the distance between the two adjacent channel walls 115 forming the channel 200 that forms the separation path 300 is set to make sure that the nanorods 111 are formed with the predetermined height. For example, the distance between the two channel walls 115 is set to a height such that all the nanoparticles 131 do not outgas and at least some of them fall down and remain in the groove. For example, the distance between the two channel walls 115 is set to 200 μm or less, to be more specific, 150 to 200 μm.

Additionally, in an example, since the channel wall 115 of the channel 200 should be stably retained in the separation path 300, the thickness of the channel wall 115 is set to a dimension such that the channel wall 115 does not collapse and is retained in the etching process of the channel wall 115. For example, the thickness of the channel wall 115 is set to 15 μm or more, to be more specific, 15 to 30 μm.

Figure 8:
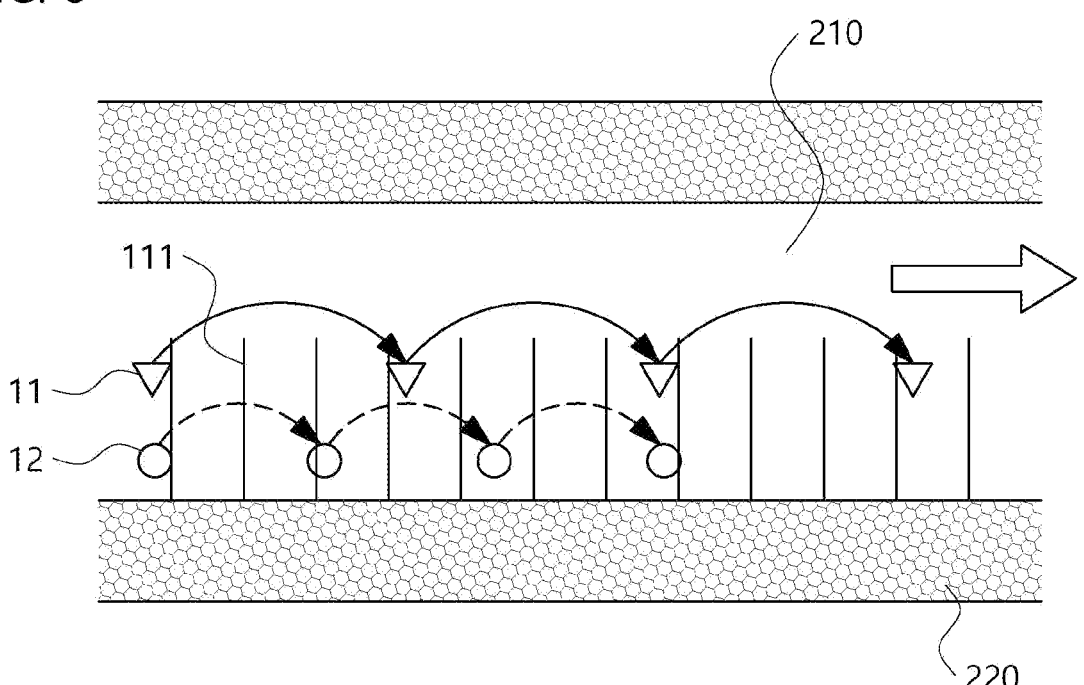
FIG. 8 is a schematic diagram showing the inner part of a separation path of a sensor element for a gas sensor according to an embodiment.

FIG. 8 is a schematic diagram showing the inner part of the channel 200 that forms the separation path 300 according to an embodiment of the present disclosure.

According to this embodiment, for the channel 200 that forms the separation path 300 to act as the separation path, a porous material 220 capable of adsorbing the gaseous phase materials is coated on the inside of the channel 200. For example, the porous material 220 may be a porous polymer such as polydimethylsiloxane (PDMS).

The porous material 220 may be coated on the channel 200 before the substrate 110 and the cover 120 are joined to each other (see FIGS. 4F and 4G), and may be coated by a gas flow process through a feed pipe (not shown).

Although not shown in FIG. 8 in detail, the porous material 220 is coated on not only the inner surface of the channel 200 but also the surface of the nanorods 111.

The gaseous phase materials, most of which are organic compounds are attached to the porous polymer by van der Waals forces. As opposed to the conventional art, since the porous material is also coated on the nanorods 111, many gaseous phase materials are attached to the nanorods 111 (also attached to the inner surface of the channel 200). In this instance, when carrier gas flows into the separation path 300, the gaseous phase materials attached to the nanorods 111 and the inner surface are separated by the force of the carrier gas and move a predetermined distance and attach to a different location as the gaseous phase materials lose mobility, and this process repeats.

Since the gaseous phase materials differ in mass and van der Waals forces interacting with the porous material 220 depending on components, as shown in FIG. 8, the gaseous phase materials 60 of different types differ in frequency and distance to which the gaseous phase materials 60 attach the porous material 220 coated on the surface of the nanorods 111 and then separate and move. That is, the gaseous phase materials move in the separation path 300 at different movement speeds depending on components. For example, among a first material 11 indicated in triangle and a second material 12 indicated in circle, the second material 12 moves faster.

According to this embodiment, since the separation path 300 has the long path amounting to about 3 m, the gaseous phase materials fed into the entrance 301 of the separation path 300 move the equal distance for each component while moving along the long path, and are agglomerated together and leave the exit 302 of the separation path 300 for each component. Since the gaseous phase materials have different movement speeds depending on components, the gaseous phase materials are separated into types and leave the exit 302 of the separation path 300 at a time interval. That is, without an operation of applying electricity, only by allowing hazardous materials to travel through the separation path 300, the gaseous phase materials are separated into types and leave at a time interval.

Meanwhile, referring back to FIG. 6, the channel 200 may be used as a concentration chamber 400 to capture the gaseous phase materials in the gases flowing in the channel 200. In other words, the nanorods 111 formed in the channel 200 are used as a structure for capturing the gaseous phase materials.

However, to store the gaseous phase materials at a sufficient concentration to analyze using the gas sensor, it requires a sufficiently large volume of the space of the channel 200 that forms the concentration chamber 400. Accordingly, the distance between the channel walls 114 of the channel 200 that forms the concentration chamber 400 is larger than the distance between the channel walls 115 of the channel 200 that forms the separation path 300.

When forming the channel 200, at the distance between two walls that is larger than a predetermined level, the nanorods may not be formed as described above.

Accordingly, according to this embodiment, an auxiliary wall 113 is formed in the channel 200 that forms the concentration chamber 400. At least one auxiliary wall 113 may be formed according to the volume of the concentration chamber 400.

Describing with reference to FIG. 7, in FIG. 7, two walls, one at each of two ends, are the channel wall 114, and four walls at the center are the auxiliary wall 113.

According to this embodiment, the distance between the channel wall 114 of the channel 200 and its adjacent auxiliary wall 113 and the distance between the adjacent auxiliary walls 113 when the number of auxiliary walls is two or more, are set to a height such that all the nanoparticles 131 do not outgas and at least some of them fall down and remain in the groove, to make sure that the nanorods 111 are formed with the predetermined height. For example, the corresponding distance is set to 200 μm or less, to be more specific, 150 to 200 μm.

In case the channel 200 is formed as the concentration chamber 400, when removing the masking layers 130, 140, the auxiliary wall 113 is within the area of the channel 200, but the masking layers 130, 140 corresponding to the area in which the auxiliary wall 113 will be formed is not removed (in FIG. 6, the gray shaded area in the concentration chamber 400 is the area in which the masking layer is removed). That is, in case the channel 200 is formed as the concentration chamber 400, the channel walls 114 and each auxiliary wall 113 of the channel 200 are the sidewall 112 described in the process of FIG. 4.

However, in case the channel 200 is formed as the separation path 300, the channel wall 115 should be retained after the etching to keep the path of the channel 200 running in a line, but in case the channel 200 is formed as the concentration chamber 400, there is no need to do so.

In other words, if the collapse of the auxiliary wall 113 increases the total volume of the concentration chamber 400, the auxiliary wall 113 may fall down and collapse after it contributes to the formation of the nanorods 111.

Accordingly, the thickness of the auxiliary wall 113 may be set to a thickness such that the auxiliary wall 113 collapses in the etching process, and may be, for example, less than 15 μm. In this embodiment, the thickness of the auxiliary wall 113 is, for example, 5 μm.

Referring to FIG. 4F, in FIG. 4F, when the left sidewall is the channel wall 114 and the right sidewall is the auxiliary wall 113, the lower portion of the auxiliary wall 113 may be broken and the auxiliary wall 113 may collapse during the formation of the nanorods 111 by the process of FIG. 4F. The collapsed auxiliary wall 113 is etched away together by the etching process. The structure of the collapsed auxiliary wall 113 may become a structure for capturing the gaseous phase materials together with the nanorods 111.

According to this configuration, it may be possible to increase the cross-sectional area of the channel 200 that forms the concentration chamber 400, i.e., the volume of the chamber, and form the structure of a sufficient cross-sectional area for capturing the gaseous phase materials in the channel 200.

According to this embodiment, for the channel 200 that forms the concentration chamber 400 to have the function as the concentration chamber 400, an adsorbent material capable of capturing the gaseous phase materials is filled in the channel 200. The adsorbent material may include, for example, a material such as a carbon compound capable of adsorbing the gaseous phase materials that are an organic compound by van der Waals forces to capture the gaseous phase materials.

The adsorbent material may be filled in the channel 200 before the substrate 110 and the cover 120 are joined to each other (see FIGS. 4F and 4G), and may be filled by a gas flow process through a feed pipe (not shown).

Since the adsorbent material is located between the nanorods 111, the adsorbent material may be filled in the concentration chamber 400 in a sufficient amount to capture the gaseous phase materials.

According to this embodiment, it may be possible to form the structure of the separation path 300 and the concentration chamber 400 in one substrate 110 all together at the same time by performing the method for manufacturing the channel 200 only once. That is, the basic structure of the separation path 300 and the concentration chamber 400 may be formed all together at the same time only by designing such that the gray shaded pattern in FIG. 6 is etched through the steps of FIGS. 4A to FIG. 4C, and performing the steps of FIGS. 4D to FIG. 4F.

When the process of FIGS. 4A to 4F is performed, the porous material capable of adsorbing the gaseous phase materials is coated on the inside of a portion of the channel 200 formed in the substrate 110, and the adsorbent material capable of capturing the gaseous phase materials is filled in the other portion of the channel 200 formed in the substrate 110, the sensor element 100 having the separation path 300 and the concentration chamber 400 on one substrate 110 may be formed.

According to an embodiment of the present disclosure, the gas sensor 500 includes the sensor element 100 configured as described above.

Figure 9:
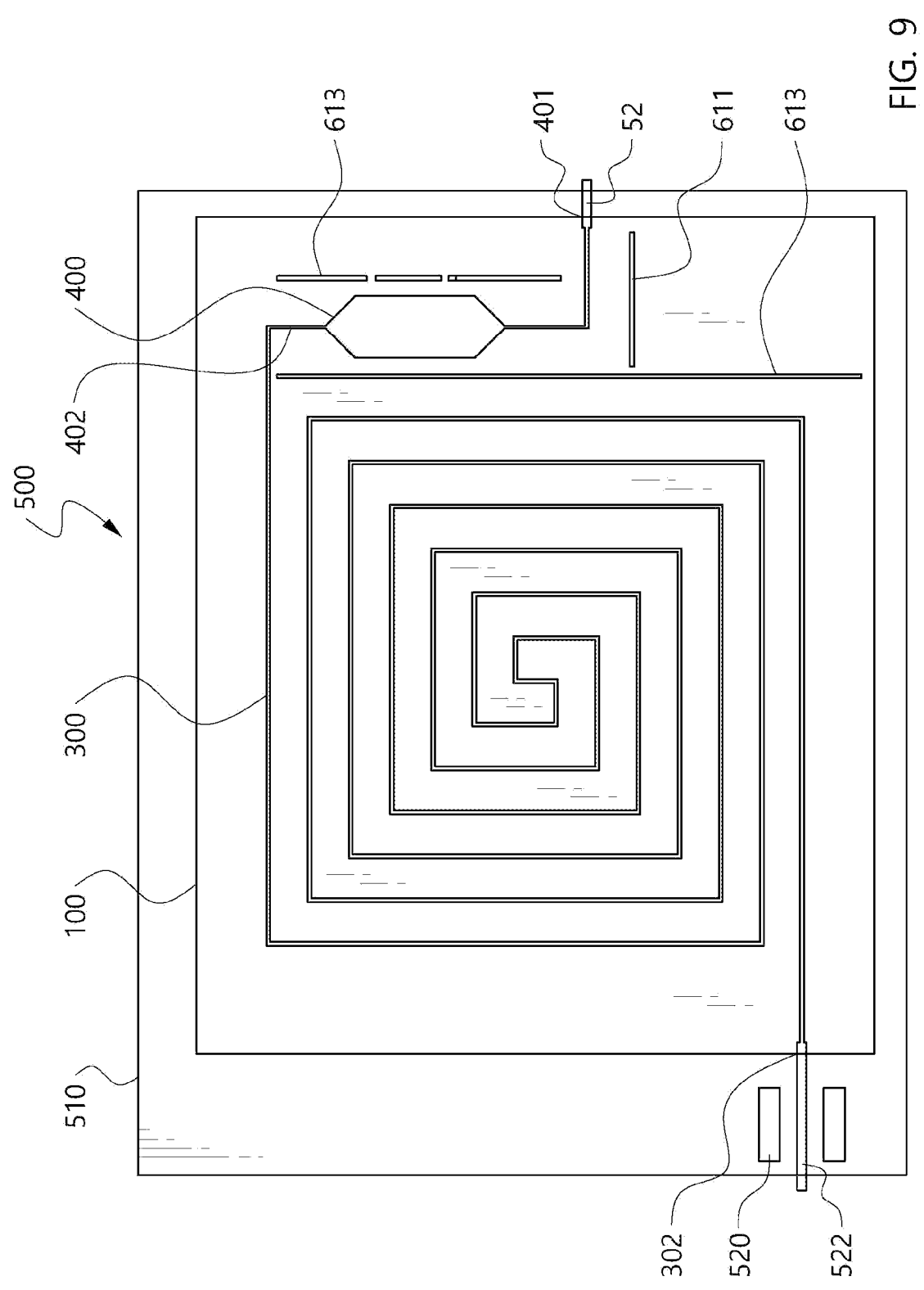
FIG. 9 is a schematic top view of a gas sensor according to an embodiment.
Figure 10:
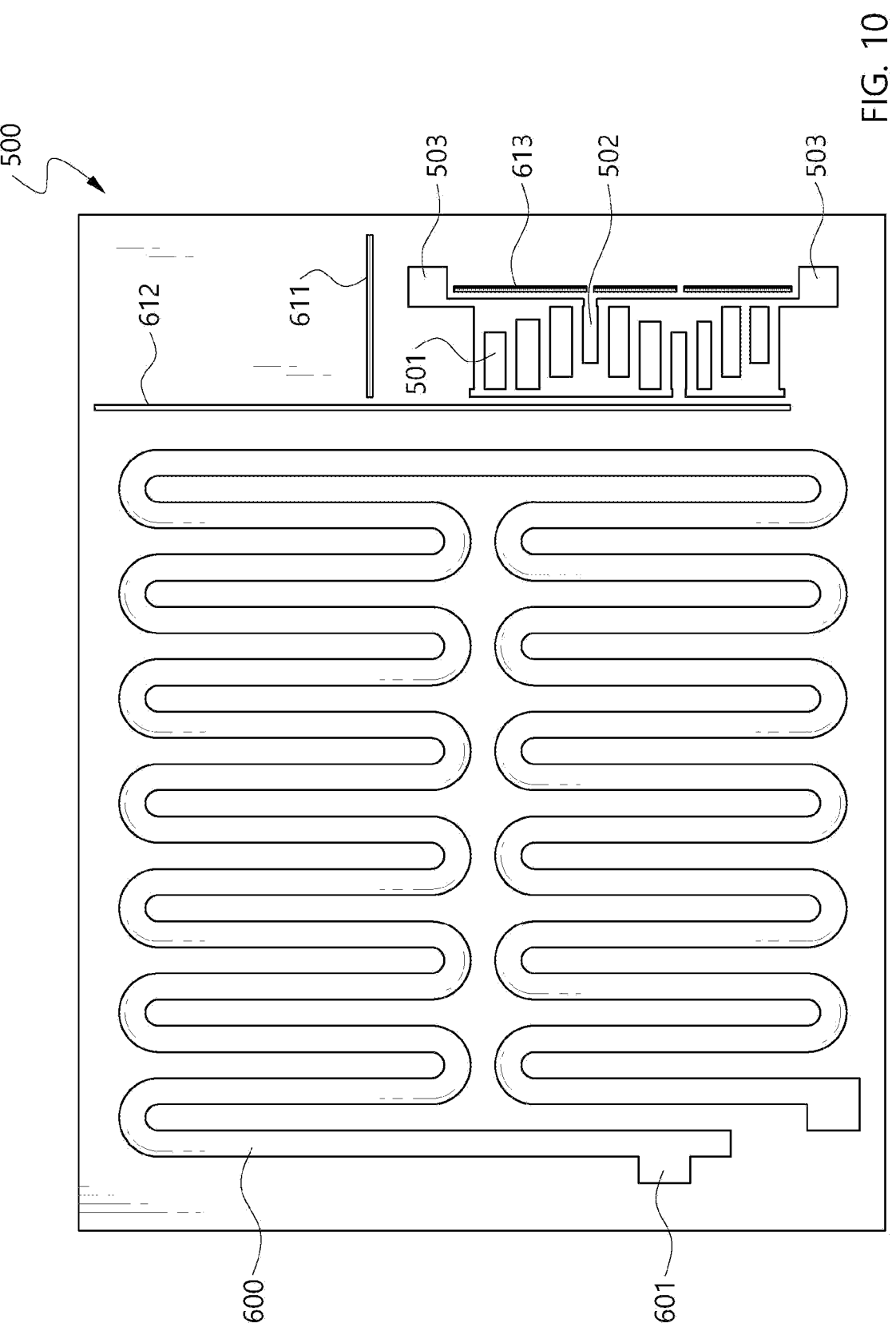
FIG. 10 is a schematic rear view of a gas sensor according to an embodiment.

FIG. 9 is a schematic top view of the gas sensor 500 according to an embodiment, and FIG. 10 is a schematic rear view of the gas sensor 500.

As shown in FIG. 9, the gas sensor 500 has a structure in which the sensor element 100 and a detection sensor 520 are installed at a single body 510. A power source (not shown) for a heat line and the detection sensor 520 and a communication device (not shown) to transmit a signal of the detection sensor 520 may be included in the body 510. Additionally, a memory to store information such as libraries about the time required for each gaseous phase material to exit the separation path 300, and a processor to obtain a result by comparing information detected by the detection sensor with the libraries may be included in the body 510. Furthermore, the body 510 may have a speaker or a crystal liquid display to notify an operator of the result. However, the function of the memory and the processor may be performed by a computer, and the gas sensor 500 may transmit the detection result by the detection sensor 520 to the computer via communication with the computer to enable the computer to process it.

The body 510 has a conduit 522 that communicates with the exit 302 of the separation path 300 of the sensor element 100 and extends across the detection sensor 520. Additionally, the body 510 has a conduit 521 in communication with a conduit 401 leading to the concentration chamber 400 of the sensor element. The conduits 521, 522 may be formed through a DRIE process.

The concentration chamber 400 has an approximately long polygonal shape including two opposite shorter sides extending in the short direction of the concentration chamber 400 and two opposite longer sides extending in the long direction of the concentration chamber 400.

The shorter side is bent approximately in the shape of letter "v" such that the center faces away from the longer side, thereby achieving uniform diffusion of fluid flow in the concentration chamber 400.

An inlet pipe line 401 is formed at the central part of one shorter side of the concentration chamber 400 and communicates with the concentration chamber 400 to allow the gas mixture to enter. An outlet pipe line 402 is formed at the central part of the other shorter side of the concentration chamber 400 to allow gases to exit the concentration chamber 400.

The terms "entrance" and "exit" as used herein are intended to refer to different openings through which the fluid enters and exits the corresponding pipe line, but not particularly limited to the entrance where the fluid enters the corresponding pipe line and the exit where the fluid comes out. That is, in some instance, the fluid may enter the corresponding pipe line through the exit and leave the corresponding pipe line through the entrance.

The gaseous phase materials 60 fed into the concentration chamber 400 are captured using the adsorbent, and preconcentrated and stored in the concentration chamber 400.

To allow the gaseous phase materials preconcentrated and stored in the concentration chamber 400 to exit the concentration chamber 400, it is necessary to debond the adsorbent and the gaseous phase materials, and the gas sensor 500 according to this embodiment includes a heating device to apply heat to the concentration chamber 400.

FIG. 10 shows the rear side of the gas sensor 500.

The heat line 501 is attached to the rear side, and is a chamber heating device to generate heat when power is applied. The heat line 501 is formed in the gas sensor 500 (the sensor element 100) at a location corresponding to the concentration chamber 400. The heat line 501 has a terminal 503 to connect to the power source. A temperature sensor 502 may be disposed at the center of the heat line 501 to measure the temperature rise by the heat line 501.

Heat may be generated by applying the power to the heat line 501, and thermal energy for debonding the adsorbent and the gaseous phase materials may be selectively applied to the concentration chamber 400.

Meanwhile, as shown in FIG. 10, according to this embodiment, to improve reactivity within the separation path 300, a heat line 600 configured to selectively apply heat to the separation path 300 may be formed on the rear side of the gas sensor 500 (the sensor element 100) at a location corresponding to the separation path 300. The heat line 600 has a terminal 601 at two ends to apply the power.

In this instance, when heat applied by the heat line 501 is conducted by a first substrate of silicon, unexpected heat may be applied to the adjacent component such as the separation path 300.

To prevent the thermal conduction, according to this embodiment, a plurality of slits 611, 612, 613 completely passing through the sensor element 100 is formed along the heat line 501.

After the gaseous phase materials are preconcentrated in the concentration chamber 400 for a predetermined time, power is applied to the heat line 501 to apply heat to the concentration chamber 400. The gaseous phase materials preconcentrated and stored in the concentration chamber 400 are separated from the adsorbent by the applied thermal energy, and the carrier gas flowing across the concentration chamber 400 carries the gaseous phase materials to take the gaseous phase materials out of the concentration chamber 400. The carrier gas (the gas mixture) carrying the gaseous phase materials flows to the separation path 300.

The high concentration of gaseous phase materials exiting the concentration chamber 400 instantaneously enters the separation path 300. That is, the concentration chamber 400 according to this embodiment acts as a reservoir to preconcentrate and store hazardous materials but also an injector to feed the high concentration of hazardous materials into the separation path 300.

As described above, the gaseous phase materials passing through the separation path 300 are separated into types while moving along the separation path and leave the separation path at a time interval.

The gaseous phase materials leaving the exit 302 of the separation path 300 in a sequential order are detected by the detection sensor 520.

The detection sensor 520 according to this embodiment is a photoionization detector (PID) sensor that measures a voltage change caused by electrons ejected from the gaseous phase materials by applying ultraviolet (UV) light to the gaseous phase materials coming out of the separation path 300. Specifically, when UV light shines on a material such as an organic compound, electrons are ejected, producing electric potential.

The higher concentration of the corresponding material, the higher potential value detected, and accordingly the concentration of the corresponding material may be calculated.

Figure 11:
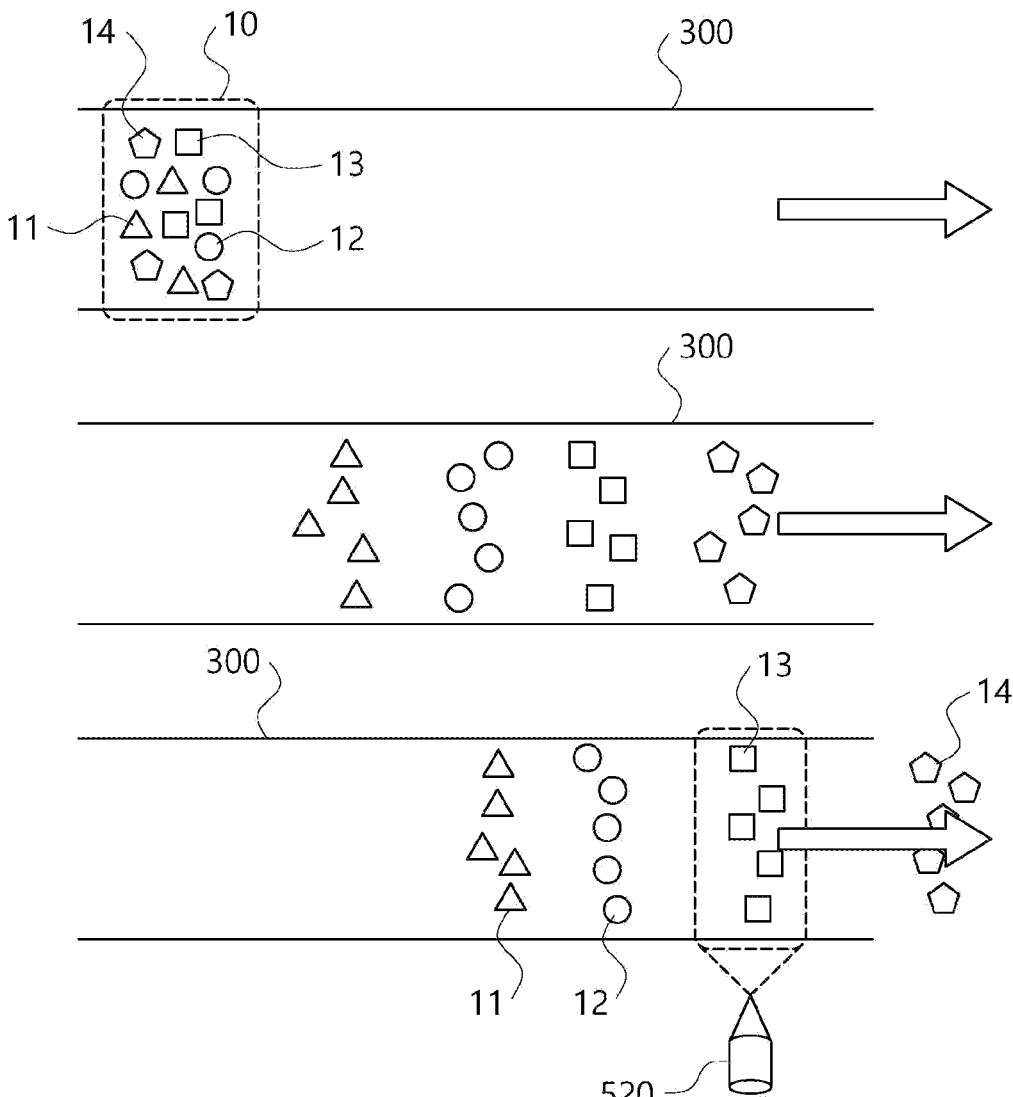
FIG. 11 shows briefly a process of separating and detecting gaseous phase materials using a detection sensor of a gas sensor according to an embodiment.

FIG. 11 shows briefly a process of separating and detecting the gaseous phase materials 10 using the detection sensor 520 according to this embodiment.

As described above, within the separation path 300, the gaseous phase materials 60 have different movement speeds depending on components. In FIG. 11, the illustration of the nanorods 111 is omitted for simplicity.

Through the experiment, the time required for the gaseous phase materials 10 to exit the separation path 300 may be pre-acquired according to the type.

For example, benzene may be detected by the detection sensor 520 in about 0.3 min. In this way, the experiment may be performed for each of predicted gaseous phase materials 10, and libraries about the time required for each gaseous phase material 10 to exit the separation path 300 may be generated.

Since the gaseous phase materials 11, 12, 13, 14 of different types exit the separation path 300 in a sequential order, the type of the corresponding gaseous phase material may be determined by monitoring the time when the potential value significantly increases through the detection sensor 520, and the concentration of the corresponding gaseous phase material may be determined through the potential value.

Figure 12:
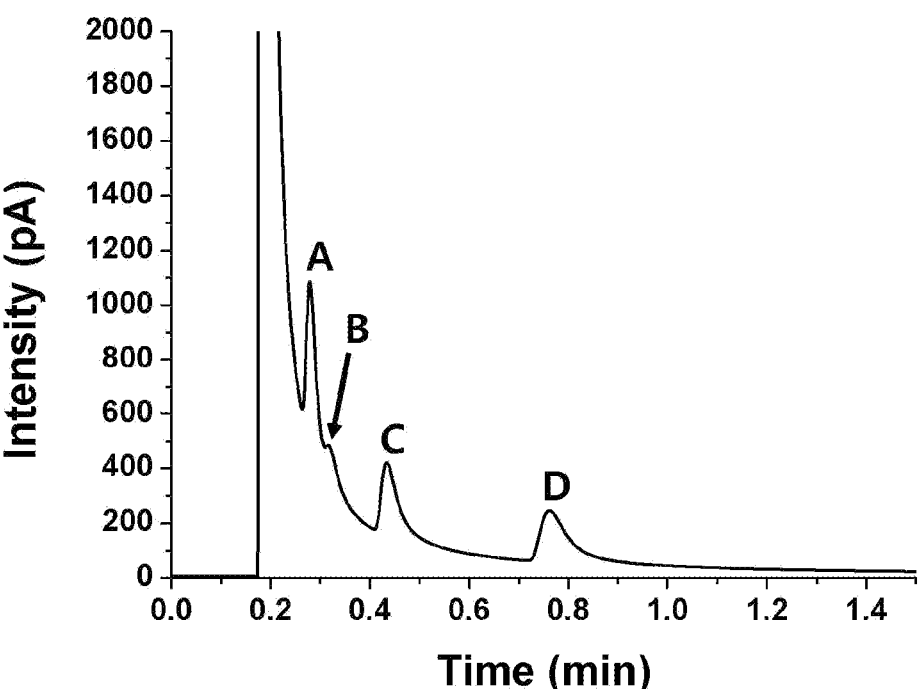
FIG. 12 is a graph showing a result of detecting gaseous phase materials using a gas sensor having a sensor element according to an embodiment.
Figure 13:
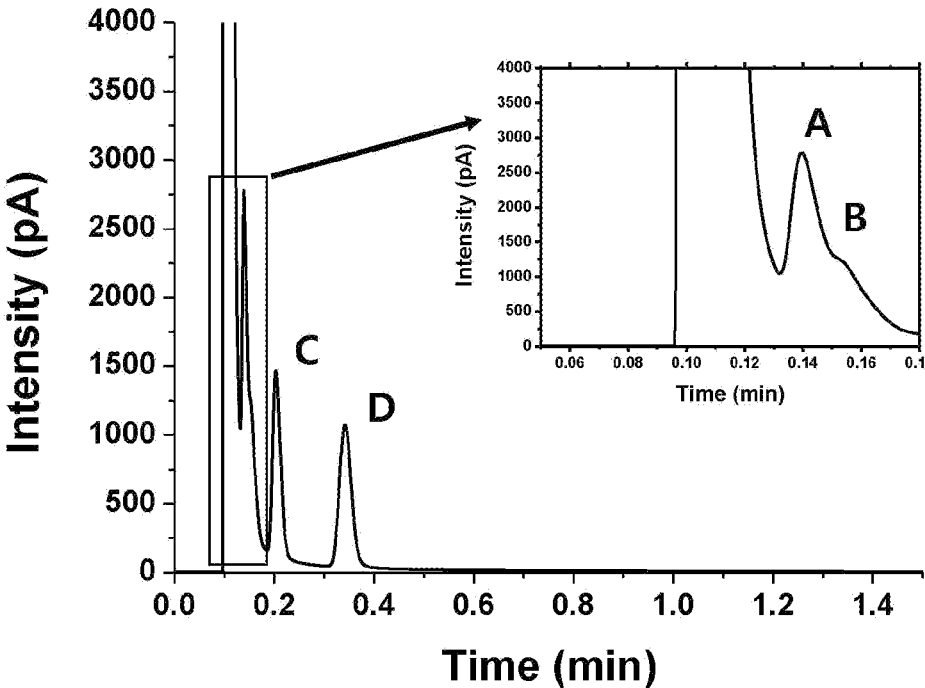
FIG. 13 is a graph showing a result of detecting gaseous phase materials using a conventional gas sensor as a comparative example.

FIG. 12 is a graph showing a result of detecting gaseous phase materials using the gas sensor 500 including the sensor element 100 according to an embodiment. FIG. 13 is a graph showing a result of detecting gaseous phase materials using the gas sensor (the conventional gas sensor) having the same conditions such as dimensions as the gas sensor 500 according to this embodiment, but not having the nanorods in the channel as a comparative example. In the two gas sensors, the separation path was formed in the 3 m long column shape.

In FIGS. 12 and 13, a material indicated by peak A is benzene, a material indicated by peak B is trichloroethylene, a material indicated by peak C is toluene, and a material indicated by peak D is p-xylene.

It was confirmed that both the gas sensor 500 according to this embodiment and the conventional gas sensor showed 4 peaks corresponding to 4 gaseous phase materials. In both cases, the types and amounts of the gaseous phase materials included in the gas mixture were analyzed through the intensity of the potential value by the components of the corresponding gaseous phase materials.

However, as shown in FIGS. 12 and 13, in the case of the gas sensor 500 according to this embodiment, compared to the conventional gas sensor, two peaks (A and B) detected at a short time interval were distinguished more clearly, and peak B was found more clearly. Additionally, the gaseous phase materials were detected at a later time than the conventional gas sensor.

In other words, it signifies that the gaseous phase materials may be separated into types more accurately while moving in the separation path 300 more slowly by the interference by the nanorods 111. It was confirmed that the separation path according to this embodiment had the column efficiency (N) of 823, 36 on the basis of xylene, showing a 17% improvement compared to the conventional gas sensor.

That is, it was confirmed that in the same size condition, the gas sensor 500 according to this embodiment had much higher resolution and accuracy of the gaseous phase materials than the conventional gas sensor.

Additionally, it was confirmed that the gas sensor 500 according to this embodiment had high separation performance of the gaseous phase materials in the separation path 300, implying that the gas sensor 500 according to this embodiment may exhibit the same performance as the conventional gas sensor at a smaller length of the separation path 300.

Accordingly, the separation path 300 is not particularly limited to the column shape bent in a serpentine pattern, and may be formed with a small length in a simple shape, for example, a straight line shape or bent multiple times. Therefore, it may be possible to significantly reduce the size of the gas sensor 500.

What is claimed is:

1. A sensor element for a gas sensor, comprising:
a substrate; and
a channel formed in the substrate and configured to allow gases to flow to a detection sensor that is configured to detect gaseous phase materials in the gas sensor,
wherein the channel has nanoscale nanorods inside, the nanorods interfering with a flow of the gaseous phase materials in the gases flowing in the channel,
wherein the channel is formed based on a groove formed in the substrate by etching,
wherein the nanorods are formed based on an unetched portion of the substrate other than the groove, and
wherein lengths of the nanorods vary and the nanorods protrude irregularly from a bottom of the channel.

2. The sensor element for the gas sensor according to claim 1, wherein a porous material capable of adsorbing the gaseous phase materials is coated on the inside of the channel, and
wherein the channel is a separation path to separate the gaseous phase materials in the gases flowing in the channel into types during movement by repeated adsorption and desorption to/from a structure in the channel.

3. The sensor element for the gas sensor according to claim 1, wherein the channel is filled with an adsorbent material capable of capturing the gaseous phase materials, and
wherein the channel is a concentration chamber for capturing the gaseous phase materials in the gases flowing in the channel inside the channel.

4. The sensor element for the gas sensor according to claim 1, wherein a porous material capable of adsorbing the gaseous phase materials is coated on an inside of a first portion of the channel formed in the substrate, and
wherein an adsorbent material capable of capturing the gaseous phase materials is filled in a second portion of the channel formed in the substrate.

5. A method for manufacturing the sensor element for the gas sensor according to claim 1, the method comprising:
preparing the substrate;
forming a masking layer on the substrate;
removing the masking layer corresponding to an area in which the channel will be formed; and
etching the groove in the substrate to form the channel,
wherein the masking layer is etched together during the etching and a material of the masking layer breaks down into nanoparticles, and the nanoparticles accumulate within the groove and act as a micro-mask, and
wherein a portion of the substrate that is not etched by the micro-mask forms the nanorods in the channel.

6. The method for manufacturing the sensor element for the gas sensor according to claim 5, wherein the forming of the masking layer comprises:

forming a hard masking layer on the substrate, and applying a photosensitizer onto the hard masking layer, and wherein the removing of the masking layer comprises:

removing the photosensitizer corresponding to an area in which the channel will be formed, and removing the hard masking layer exposed by removing the photosensitizer.

7. The method for manufacturing the sensor element for the gas sensor according to claim 5, wherein a distance between two adjacent channel walls that form the channel is set such that all the nanoparticles do not outgas during the etching and some of the nanoparticles remain in the groove.

8. The method for manufacturing the sensor element for the gas sensor according to claim 7, wherein a thickness of the channel walls that form the channel is set to a thickness such that the channel walls do not collapse during the etching.

9. The method for manufacturing the sensor element for the gas sensor according to claim 7, further comprising:

coating a porous material capable of adsorbing the gaseous phase materials on an inside of the channel.

10. A method for manufacturing a sensor element for a gas sensor, the method comprising:

preparing a substrate;

forming a masking layer on the substrate;

removing the masking layer corresponding to an area in which a channel will be formed; and etching a groove in the substrate to form the channel, wherein the masking layer is etched together during the etching and a material of the masking layer breaks down into nanoparticles, and the nanoparticles accumulate within the groove and act as a micro-mask, and wherein a portion of the substrate that is not etched by the micro-mask forms nanorods in the channel, wherein an auxiliary wall is formed between channel walls that form the channel, and wherein the removing of the masking layer comprises not removing the masking layer corresponding to an area in which the auxiliary wall will be formed within the area in which the channel will be formed.

11. The method for manufacturing the sensor element for the gas sensor according to claim 10, wherein a first distance between a channel wall of the channel walls and the auxiliary wall and a second distance between adjacent auxiliary walls are set such that all the nanoparticles do not outgas during the etching and some of the nanoparticles remain in the groove.

12. The method for manufacturing the sensor element for the gas sensor according to claim 11, wherein a thickness of the auxiliary wall is set to a thickness such that the auxiliary wall collapses during the etching.

13. The method for manufacturing the sensor element for the gas sensor according to claim 10, further comprising:

coating an adsorbent material capable of capturing gaseous phase materials on an inside of the channel.

14. The method for manufacturing the sensor element for the gas sensor according to claim 6, wherein the hard masking layer is formed by depositing aluminum on the substrate.

15. A gas sensor, comprising:

the sensor element for the gas sensor according to claim 1; and the detection sensor configured to detect the gaseous phase materials exiting the sensor element for the gas sensor.

16. The gas sensor according to claim 15, wherein a porous material capable of adsorbing the gaseous phase materials is coated on the inside of the channel, and the channel is a separation path along which the gaseous phase materials in the gases move at different speeds depending on components, and wherein the detection sensor is configured to detect the gaseous phase materials leaving the separation path at a time interval.

17. The gas sensor according to claim 15, wherein an adsorbent material capable of capturing the gaseous phase materials is coated on the inside of the channel, and the channel is a concentration chamber capable of capturing the gaseous phase materials in the gases, and wherein the gas sensor further comprises a heating device to selectively heat the concentration chamber.

18. The gas sensor according to claim 15, wherein a porous material capable of adsorbing the gaseous phase materials is coated on an inside of a first portion of the channel other than a second portion of the channel acting as a concentration chamber, and is a separation path along which the gaseous phase materials in the gases move at different speeds depending on components, and wherein the gaseous phase materials exiting the concentration chamber enter the separation path and are separated into types based on the gaseous phase materials being heated by a heating device, and wherein the detection sensor is configured to detect the gaseous phase materials leaving the separation path at a time interval.

* * * * *